(12) United States Patent
Liao et al.

(10) Patent No.: US 11,983,267 B2
(45) Date of Patent: May 14, 2024

(54) DATA PROCESSING METHOD AND CIRCUIT THEREOF BASED ON TROJAN CIRCUIT DETECTION

(71) Applicant: INSTITUTE FOR INFORMATION INDUSTRY, Taipei (TW)

(72) Inventors: Jian Wei Liao, Taipei (TW); Ting Yu Lin, Taipei (TW); Kai Chiang Wu, Taipei (TW); Jung Che Tsai, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 280 days.

(21) Appl. No.: 17/538,963

(22) Filed: Nov. 30, 2021

(65) Prior Publication Data
US 2023/0153423 A1 May 18, 2023

(30) Foreign Application Priority Data

Nov. 17, 2021 (TW) ................................. 110142746

(51) Int. Cl.
*G06F 21/55* (2013.01)
(52) U.S. Cl.
CPC ........ *G06F 21/55* (2013.01); *G06F 2221/034* (2013.01)
(58) Field of Classification Search
CPC ........................................................ G06F 21/55

USPC .......................................................... 726/23
See application file for complete search history.

(56) References Cited

U.S. PATENT DOCUMENTS

| 2020/0104497 A1* | 4/2020 | Crouch | ................... G06F 21/76 |
| 2020/0387601 A1* | 12/2020 | Schat | ................... G06F 11/349 |
| 2021/0097220 A1* | 4/2021 | Bhunia | ................... G06N 7/01 |

FOREIGN PATENT DOCUMENTS

| CN | 112231775 A | 1/2021 |
| CN | 113312678 A | 8/2021 |
| CN | 113626812 A | 11/2021 |

OTHER PUBLICATIONS

JP Office Action dated Feb. 7, 2023 as received in Application No. 2021-195909.
Taiwan Office Action date Jul. 28, 2022 as received in application No. 110142746.

* cited by examiner

*Primary Examiner* — Kambiz Zand
*Assistant Examiner* — Phuc Pham
(74) *Attorney, Agent, or Firm* — Maschoff Brennan (57) ABSTRACT

A data processing method based on Trojan circuit detection includes controlling a processor, in a testing stage, to perform following steps: obtaining a plurality of characteristic values corresponding to a logic gate circuit; performing a distribution adjustment operation on the characteristic values to generate a plurality of adjusted characteristic values; and performing classification on the adjusted characteristic values to generate a logic identification result.

12 Claims, 5 Drawing Sheets

DATA PROCESSING METHOD AND CIRCUIT THEREOF BASED ON TROJAN CIRCUIT DETECTION

CROSS-REFERENCE TO RELATED APPLICATIONS

This non-provisional application claims priority under 35 U.S.C. § 119(a) on Patent Application No(s). 110142746 filed in Republic of China (ROC) on 17 Nov. 2021, the entire contents of which are hereby incorporated by reference.

BACKGROUND

1. Technical Field

This disclosure relates to a data processing method and data processing circuit, especially to a data processing method and circuit thereof based on Trojan circuit detection.

2. Related Art

As the development of integrated circuit (IC) grows rapidly, circuit design has also become increasingly complicated. Currently, the internal of an IC is divided into different blocks for different functions. An IC designer may reduce the cost of design by obtaining the authorization from a third-party silicon intellectual property core specialized in designing certain functions of an IC. The silicon intellectual property core indicates the reusable modules in the forms of logic units, chip designs in the reusable design methodology within an IC. The silicon intellectual property core usually has passed design verification, and a designer may use the silicon intellectual property core as a design basis to shorten the required duration for designing. The designer may use the silicon intellectual property core as a basis for the logic design of application specified integrated circuit or field programmable gate array (FPGA) to shorten the duration for designing.

When providing convenience as described above, the development of silicon intellectual property core also faces some issues. For example, the development of Internet of things (IoT), the popularization of various embedded systems and the progress of manufacturing, the design and manufacturing of chip design has become increasingly complicated, which promotes the division of labor to become more professional and detailed. Therefore, the possibility of outsourced development or manufacturing also increases. From designing, manufacturing and mass production of the chips, a huge part of them are exposed to untrustworthy environments, causing the credibility of chips and related products to be questioned. In other words, IC design company is unable to obtain a detailed circuit structure within an IC without a component database, so it is impossible to determine if no Trojan exists in each block, which left information security unguaranteed. In the outsourcing manufacturing process, if the circuit is deliberately changed, it is called a malicious circuit or a hardware Trojan, which may cause the performance of the circuit to be reduced, changes in function and even information leakage.

In the existing Trojan attack prevention hardware, the attacker may randomly implant the Trojan into the chip. Therefore, each chip needs to be verified. Accordingly, although the purpose malicious behavior detection performed by hardware is achieved, these methods are at the same time cost a lot of time and money.

In summary, there is an urgent need for a novel data processing method and data processing circuit based on Trojan circuit detection.

SUMMARY

Accordingly, this disclosure provides a data processing circuit and method based on Trojan circuit detection to solve the technical problem faced by the prior art.

According to one or more embodiment of this disclosure, a data processing method based on Trojan circuit detection, includes controlling a processor, in a testing stage, to perform following steps: obtaining a plurality of characteristic values corresponding to a logic gate circuit; performing a distribution adjustment operation on the characteristic values to generate a plurality of adjusted characteristic values; and performing classification on the adjusted characteristic values to generate a logic identification result.

According to one or more embodiment of this disclosure, a data processing circuit based on Trojan circuit detection, coupled to a logic gate circuit, wherein the data processing circuit comprises a processing module, a distribution adjusting module and a classification module, and the data processing circuit, in a testing stage, performs: the processing module obtaining a plurality of characteristic values corresponding to a logic gate circuit; the distribution adjusting module performing a distribution adjustment operation on the characteristic values to generate a plurality of adjusted characteristic values; and the classification module performing classification on the adjusted characteristic values to generate a logic identification result.

In view of the above description, the present disclosure adjusts the testing stage through the training result of the training stage, wherein a plurality of pieces of training information are inputted to the training stage. The testing stage further reduces the quantity of logic paths need to be detected through the data cleansing operation and the distribution adjustment operation. Therefore, the present disclosure may provide an accurate identification result of the Trojan logic gates at the same time significantly reducing the computing time.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

A designer may use the silicon intellectual property core as a basis for logic design of application specified integrated circuit (ASIC) or field programmable gate array (FPGA). To verify whether the silicon intellectual property core is implanted with Trojan hardware, information derived from a standard cell library may be used for determination, wherein the standard cell library is a collection of electronic logic functions, such as AND, OR etc. and characteristic information (values) of the logic functions. However, due to the high repeatability of data collected, the present disclosure proposes a data processing method, which mainly solves the following problems I and II.

Problem I: It is likely to collect too much normal data during data collection. During data collection, the amount of normal data collected is usually much more than that of abnormal data, wherein the collected data is used for subsequent training stage. Therefore, one of the purposes of the present disclosure is data filtering, to exclude data with high similarity and only keep a smaller amount of unique data. Therefore, the training duration of a classification module may be reduced, wherein the training duration of the classification module is described in detail in the following description.

Problem II: Circuits that are the same circuit type based on different standard cell libraries causing the exported data to be inconsistent. Due to different manufacturing process, the same type of circuits may use different standard cell libraries, and the circuit information generated may also be different. Because the circuit information is a top secret for the vendor, the researcher would later have difficulty in analyzing due to the absence of said circuit information. Therefore, one of the purposes of the present disclosure is providing a method of adjusting the distribution of characteristic values to obtain the relationships between known and unknown standard cell libraries, to further improve the accuracy of subsequent detection without retraining the classification module. It should be noted that the "known" and "unknown" standard cell libraries mentioned in the present disclosure indicate whether the standard cell library used during the testing stage (for example, the testing stage S2 in FIG. 2) and the standard cell library used during the training stage (for example, the training stage S1 in FIG. 2) is the same or not. For example, if the standard cell library used during the testing stage is the same as the standard cell library used during the training stage, the standard cell library used during the testing stage is referred to as "known" standard cell library; on the contrary, if the standard cell library used during the testing stage is not the same as the standard cell library used during the training stage, the standard cell library used during the testing stage is referred to as "unknown" standard cell library.

Figure 1:
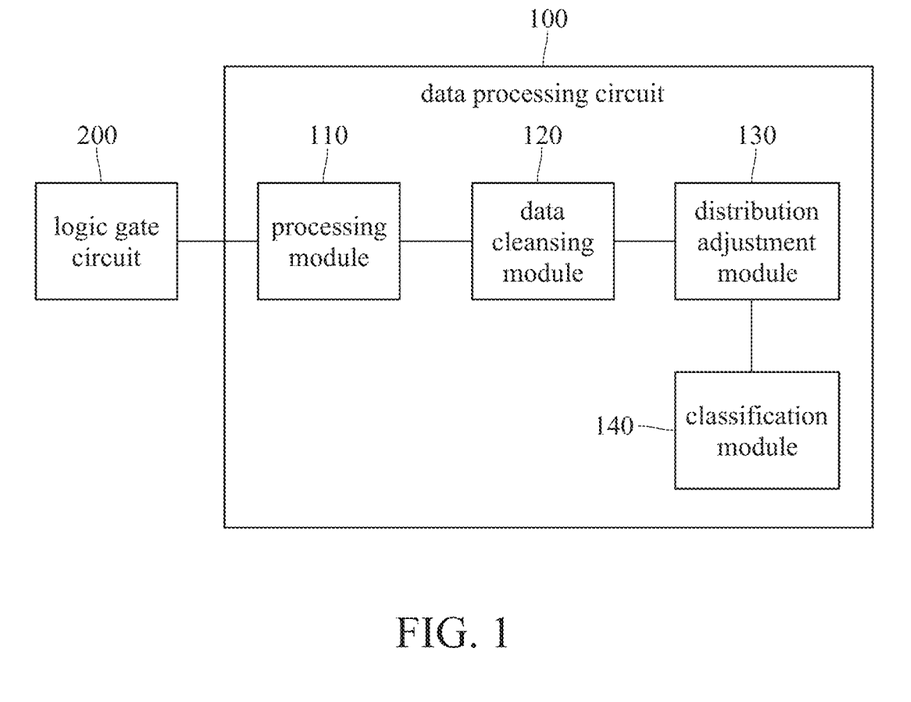
FIG. 1 is a schematic diagram of a data processing circuit based on Trojan circuit detection according to an embodiment of the present disclosure.

Please refer to FIG. 1. FIG. 1 is a schematic diagram of a data processing circuit based on Trojan circuit detection according to an embodiment of the present disclosure. The data processing circuit 100 is coupled to a logic gate circuit 200. The data processing circuit 100 comprises a processing module 110, a data cleansing module 120, a distribution adjusting module 130 and a classification module 140. The processing module 110 is coupled to the data cleansing module 120. The distribution adjusting module 130 is coupled to the data cleansing module 120 and the classification module 140. The data processing circuit 100 may be a processor, for example, a micro processing unit (MPU), a micro control unit (MCU) or a central processing unit (CPU).

Figure 2:
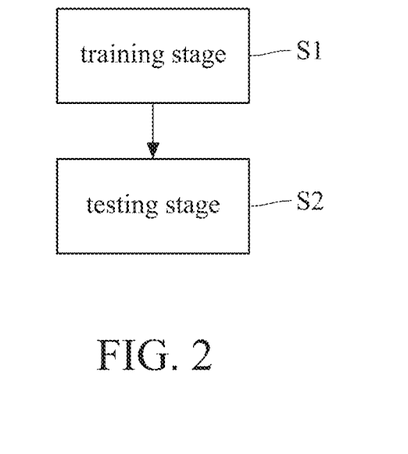
FIG. 2 is a flow chart of Trojan circuit detection performed by the data processing circuit of FIG. 1.

Please refer to FIG. 2. FIG. 2 is a flow chart of Trojan circuit detection performed by the data processing circuit of FIG. 1. As shown in FIG. 2, the data processing circuit 100 performs a training stage S1, and updates the data used subsequently in a testing stage S2 according to the training result.

Figure 3:
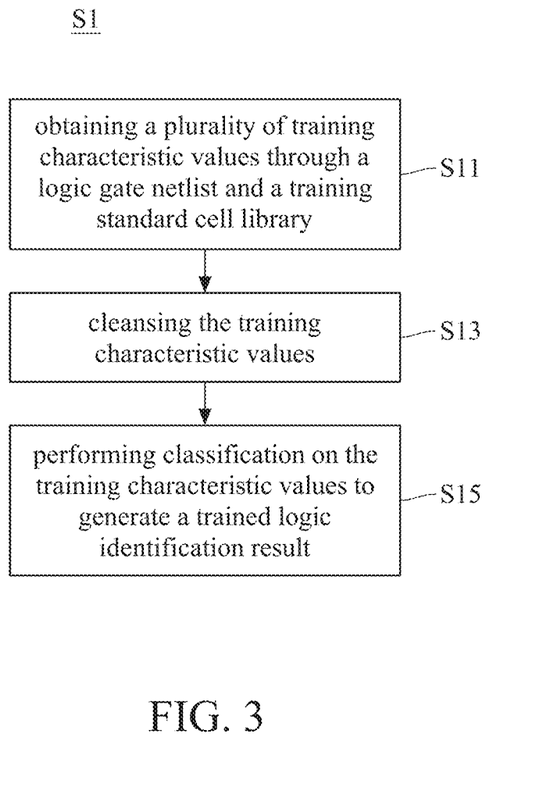
FIG. 3 is a detailed flow chart of the training stage of FIG. 2.

Please refer to FIG. 3. FIG. 3 is a detailed flow chart of the training stage of FIG. 2. As shown in FIG. 3, in step S11, the data processing circuit 100 obtains a plurality of characteristic values corresponding to a logic gate circuit from a known training standard cell library according to a logic gate netlist; in step S13, the data processing circuit 100 performs a data cleansing operation on the training characteristic values; and in step S15, the data processing circuit 100 performs classification training on the cleansed training characteristic values to generate a classifier associated with the training standard cell library. The classifier may be used subsequently on the characteristic values of the circuit to be detected to determine the quantity of Trojan logic gate in the circuit to be detected. Since the detail of steps S11 to S15 are similar to steps S21 to S29 described subsequently, for the description of steps S11 to S15, please refer to the description of steps S21 to S29.

Figure 4:
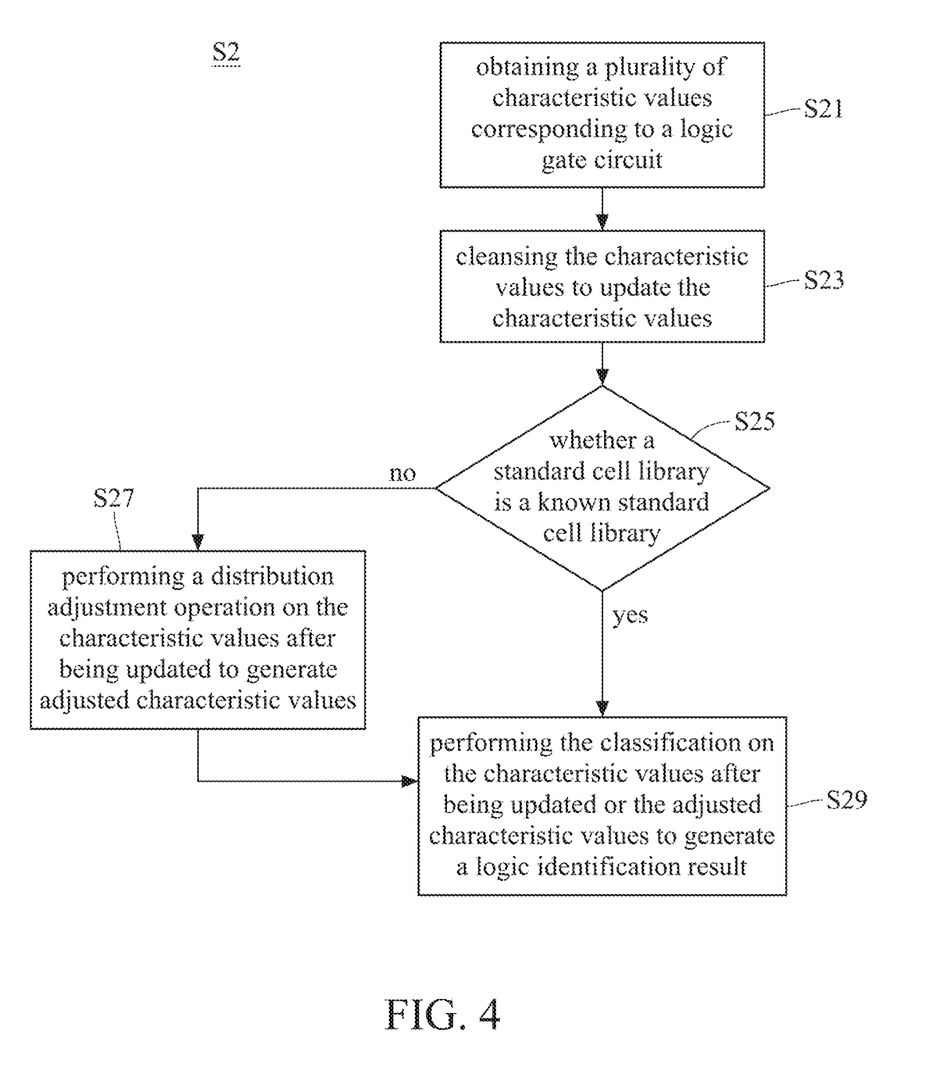
FIG. 4 is a detailed flow chart of the testing stage of FIG. 2.

Please refer to FIG. 4, FIG. 4 is a detailed flow chart of the testing stage of FIG. 2. As shown in FIG. 4, in step S21, the data processing circuit 100 obtains a plurality of characteristic values corresponding to a logic gate circuit 200; in step S23, the data processing circuit 100 performs the data cleansing operation on the characteristic values to update the characteristic values; in step S25, the data processing circuit 100 determines whether the standard cell library associated with the characteristic values is known the standard cell library, if the standard cell library associated with the characteristic values is a known standard cell library, then the data processing circuit 100 process continues to perform step S29; if the standard cell library associated with the characteristic values is an unknown standard cell library, then the data processing circuit 100 continues to perform step S27. In step S27, the data processing circuit 100 performs the distribution adjustment operation on the cleansed characteristic values (the characteristic values after being updated by step S23) to generate adjusted characteristic values; and in step S29, the data processing circuit 100 performs the classification on all the processed characteristic values to obtain the identification result of malicious logic gate in the logic gate circuit 200. For example, the processed characteristic values may be the adjusted characteristic values or the cleansed characteristic values to obtain the identification result of malicious logic gate in the logic gate circuit 200.

In detail, in step S21, the plurality of characteristic values of the logic gate circuit 200 are associated with the standard cell library. In some embodiments, a plurality of characteristic values associated with the logic gate circuit 200 may be obtained through the table of the logic gate netlist of the logic gate circuit 200 and the known standard cell library. In some other embodiments, the data processing circuit 100 may also only obtain a plurality of characteristic values of the logic gate circuit 200 but which standard cell library is associated with the characteristic values remains unknown.

The characteristic values are obtained by looking up the standard cell library based on the logic gates used in the logic gate netlist table. Specifically, the characteristic values of a logic gate path are determined based on the statistic of characteristic information extracted from the standard cell library, such as which logic gates does one path passes by, and the quantity of said logic gates. The characteristic information (values) may comprise occupied area, source power, quantity of fan-in, quantity of fan-out, probability of fan-in/fan-out being 0 and probability of fan-in/fan-out being 1, etc., of the logic gates. Fan-in and fan-out may be used as a metrics of loading capability of the logic gates, and fan-in and fan-out is defined as a quantity of logic gates that is the same type as logic gates of a logic gate circuit may be driven by said logic gate circuit. For the probability of fan-in/fan-out being 0 or 1, the signal probability of fan-in/fan-out of each logic gate is obtained during process of a dynamic simulation of the logic gate netlist table. The above-mentioned characteristic information may comprise a plurality of statistics of the logic gates, such as a maximum value, a minimum value, a sum, an average, a standard deviation, etc. For example, when one logic gate path passes a total of N logic gates, the characteristic information comprises the occupied area, source power, quantity of fan-in, quantity of fan-out, probability of fan-in/fan-out being 0 and probability of fan-in/fan-out being 1 of these N logic gates. As for the characteristic information of "occupied area", five statistics (a maximum value, a minimum value, a sum, an average, a standard deviation) of these N logic gates will be calculated, and so on. Accordingly, the logic gate path described above has 30 characteristic values (that is, 6 pieces of characteristic information multiplied by 5 statistics).

Step S23 is implemented by the data cleansing module 120 in FIG. 1. In detail, the data cleansing module 120 is configured to perform cleansing operation, which is performing a data sampling operation on the characteristic values to generate a data sampling result; and performing a data filtering operation on the data sampling result to generate a data filtering result (that is, the characteristic values after being updated). The data cleansing operation is to preliminarily exclude logic gates that are determined as "normal" (not Trojan logic gate) to reduce the time required for the classification module 140 to determine how many malicious logic gates contained in the logic gate circuit 200. The detail of the data cleansing operation is described below.

In some embodiments, the logic gate circuit 200 comprises a plurality of logic gates, and a quantity of logic gates of these logic gates may form a path based on their connection. Therefore, the logic gate circuit 200 comprises a plurality of paths formed by these logic gates.

Figure 5:
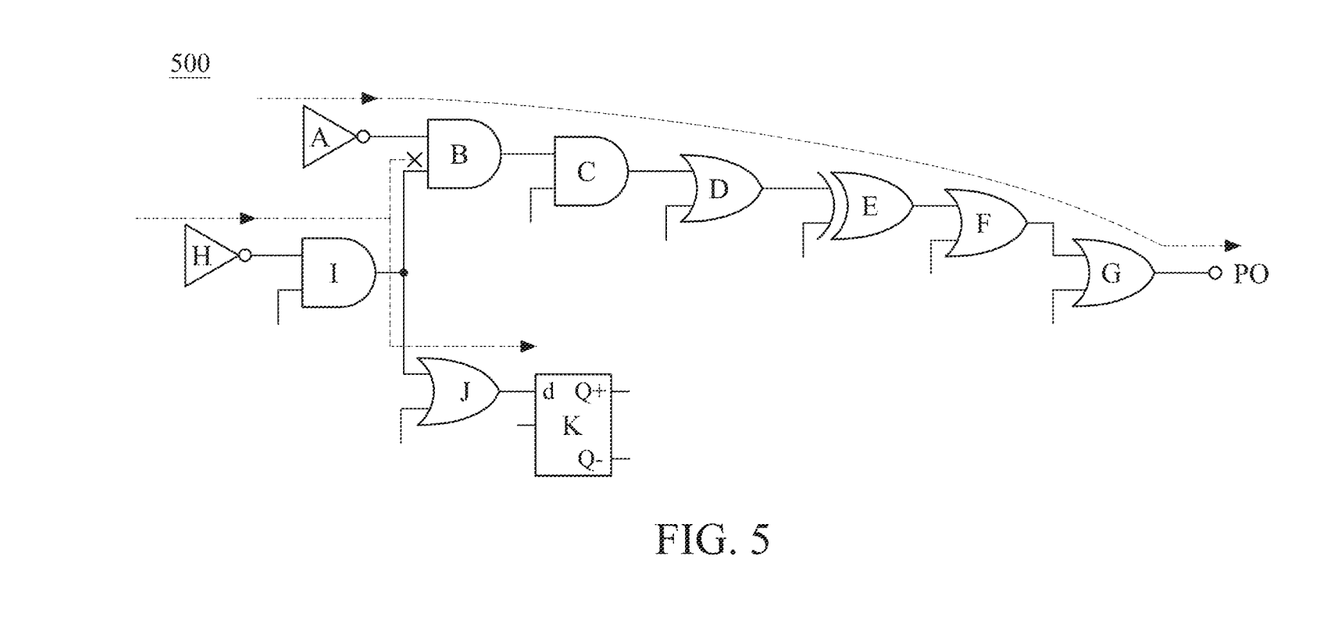
FIG. 5 is a schematic diagram of a partial logic gate circuit.

Please refer to FIG. 5. FIG. 5 is a schematic diagram of a partial logic gate circuit, which may be an example of the logic gate circuit 200 described above. As shown in FIG. 5, the logic gate circuit 500 comprises logic gates A to K and a primary output node PO, wherein these logic gates may comprise basic logic gates, such as AND, OR, NOT, XOR etc. As shown in FIG. 5, the logic gate circuit 500 comprises a path of A-B-C-D-E-F-G (that is, the path that passes these logic gates), a path of H-I-B-C-D-E-F-G and a path of H-I-J-K. In some embodiments, performing sampling operation on the logic gate circuit 500 comprises the following steps: examining the paths of the logic gate circuit 500 one by one, wherein when a current path encounters a logic gate that another path has passed by, a level-to-output distance of the current path is greater than or equal to a path similarity value, and when the level-to-output distance of the current path is smaller than or equal to a path diversity value, the current path is abandoned. The following assumes that the path diversity value is 3 and the path similarity value is 5 for description. As shown in FIG. 5, if starting from logic gate A, logic gate B is obtained next based on its connection with the logic gate A, and the next logic gate is obtained based on its connection with the logic gate B. In an embodiment, the current path is path A-B-C-D-E-F-G. Since path A-B-C-D-E-F-G is the first path being detected without encountering other logic gates that another path has passed by, path A-B-C-D-E-F-G is not abandoned. Then, if starting from logic gate H, logic gate I is obtained next based on its connection with the logic gate H, and the logic gate B is obtained next based on its connection with the logic gate I. This time, the logic gate B is detected to have been encountered by the previous path A-B-C-D-E-F-G. Then, the output distance (the quantity of logic gates) from the logic gate B to the logic gate G is determined to be 5, which is equal the path similarity value 5. Therefore, logic gate B and its subsequent connected logic gates are not added to the current path. In other words, the current path comprises logic gates H and I. Then, the data cleansing module 120 determines whether the quantity of logic gates of the current path is smaller or equal to the path diversity value. Since the quantity of logic gates of the current path H-I is 2, which is smaller than the path diversity value, the current path H-I is abandoned. Then, if starting from logic gate H, logic gates J and K is obtained next based on their connection with the logic gate I. Since the subsequent logic gates are not previously encountered by other paths, the current path H-I-J-K is kept. In other words, in this embodiment, among the three paths A-B-C-D-E-F-G, H-I and H-I-J-K, the two paths A-B-C-D-E-F-G and H-I-J-K are sampled, and paths H-I-B-C-D-E-F-G and H-I-J-K are deleted. Accordingly, since paths with high repetition are deleted by the data sampling operation, the computation and time required for subsequent detection on Trojan circuit in the logic gate circuit 500 may be reduced. It is worth noting that, the path diversity value and/or the path similarity value may also be adjusted as other values according to different designs, wherein the path diversity value and the path similarity value are natural numbers.

The following explains the data filtering operation of the data cleansing operation in step S23. The data filtering operation comprises determining a minimum of all probabilities of the net line signal of all logic gates in the current path being 0, and abandoning the current path when the minimum probability is greater than a first threshold (for example, 0.1). On the other hand, the data filtering operation further comprises determining a minimum of all probabilities of the net line signal of all logic gates in the current path being 1, and abandoning the current path when the minimum probability is greater than a second threshold (for example, 0.1).

Further, the data filtering operation is performed on the characteristic values after being updated based on the relationship between the probability of a signal appears and the threshold. When the probability of the net line signal being 1 and net line signal being 0 of a path are both high (greater than the first and second thresholds), it means a condition of only one specific signal of the net line signals appearing on the path may not exist. Therefore, it is reasonable to determine that the distribution of the quantity of times of these two signals appear on the path is normal, and that the probability of the path having hardware Trojan logic gate is low. For detail description, please refer to FIG. 6.

Figure 6:
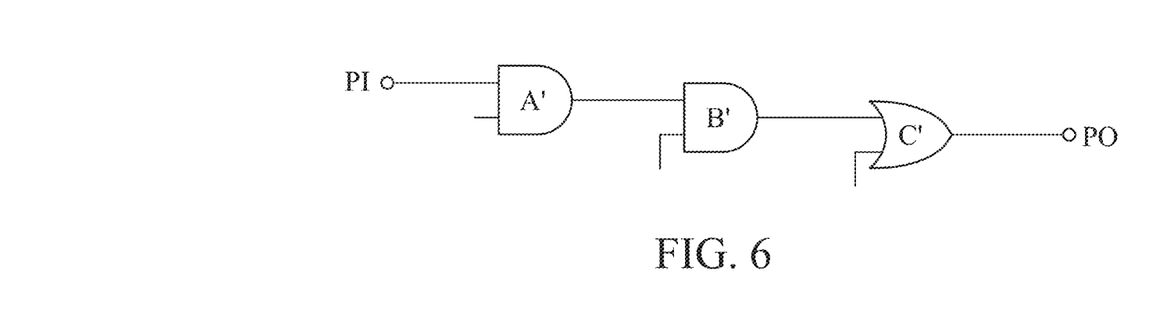
FIG. 6 is a schematic diagram of the probability of logic gate signal appear.

FIG. 6 is a schematic diagram of the probability of logic gate signal appear. As shown in FIG. 6, the probability of signals 0 and 1 appearing on the path PI-A' (wherein PI represents a node for primary input), path A'-B', path B'-C', path C'-PO respectively are 0.3/0.7, 0.6/0.4, 0.65/0.35, 0.65/0.35, wherein 0.3/0.7 indicates that the probability of 0 existing on the net line signal of the current path is 0.3 (that is, the probability is 30%) and the probability of 1 existing is 0.7 (that is, the probability is 70%), and so on. In the embodiment shown in FIG. 6, the net lines comprise, for example, the signal transmission line between logics PI and A', the signal transmission line between logics A' and B', the signal transmission line between logics B' and C', and the signal transmission line between logics C' and PO. Since the probabilities of 0 existing on the net line signal on the entire path PI-A'-B'-C'-PO all are not smaller than 0.1, and since the probabilities of 1 existing on the net line signal on the entire path PI-A'-B'-C'-PO all are not smaller than 0.1, the logic gates on this path may be determined as normal logic gates which do not contain Trojan logic gate. Therefore, the current path PI-A'-B'-C'-PO is abandoned.

In some embodiments, the method of setting the threshold comprises reading the probabilities of the signals of all logic gates of a path being 0, and using the minimum value of these probabilities representing the probability of the path (the signal is 0). Then, the maximum value of the probabilities representing all paths is multiplied by 0.2 to be used as the threshold (threshold=minimum probability×0.2). For example, if the maximum probability representing three probabilities of three paths is 0.5, then the threshold is set as 0.1. In some other embodiments, the method of setting the threshold further comprises, after obtaining the probability representing each path and calculating the average and standard deviation of these probabilities, using n standard deviations which are smaller than the average probability as the threshold (threshold=average probability–2×standard deviation). For example, if the calculated average probability is 0.25 and the standard deviation is 0.1, then the threshold is set as 0.05. It is worth mentioning that, the method of setting the threshold for the probability of the net line signal being 1 is similar to the above-described method for setting the threshold for the probability of 0, and the description for the probability of 1 is omitted herein. Accordingly, the present disclosure may adjust the quantity of paths filtered to adjust the computation of the classification module 140.

Step S25 is determining whether the standard cell library is a known standard cell library. If the standard cell library is a known standard cell library, the process continues to step S29; if not, the process continues to step S27. In detail, the distribution adjusting module 130 determines whether the standard cell library is the same as the training standard cell library to determine whether the standard cell library is a known standard cell library. If the standard cell library is not a known standard cell library, the distribution adjusting module 130 performs step S27, which is the distribution adjusting module 130 performing the distribution adjustment operation on the characteristic values to generate the adjusted characteristic values; if the standard cell library is the known standard cell library, the process continues to step S29, the distribution adjusting module 130 directly uses the characteristic values as the adjusted characteristic values. The purpose of the distribution adjustment operation is to allow the characteristic values obtained from different standard cell libraries to become more similar with each other. Accordingly, the present disclosure does not need to retrain the characteristic values associated with unknown standard cell library to obtain classifier specific for said unknown standard cell library, and may directly input the adjusted characteristic values into the classification module 140 to analyze/detect whether the logic gate circuit 200 contains any Trojan circuit.

Figure 7A:
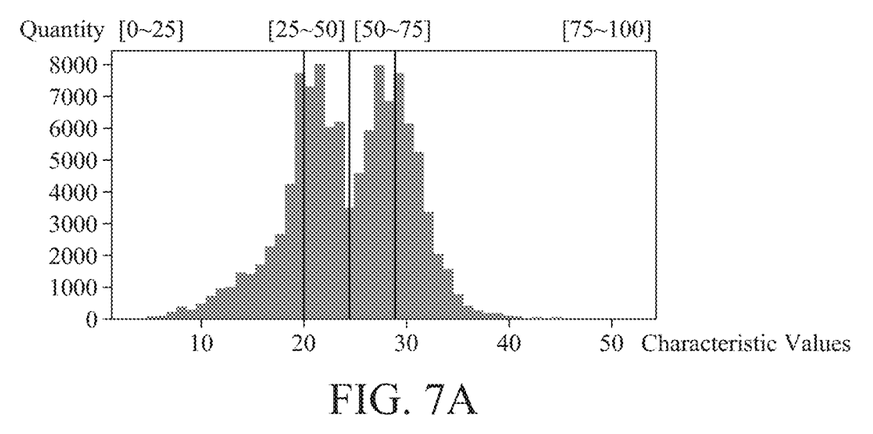
FIG. 7A is a histogram of a quantity of characteristic values versus characteristic values completed during the training stage.
Figure 7B:
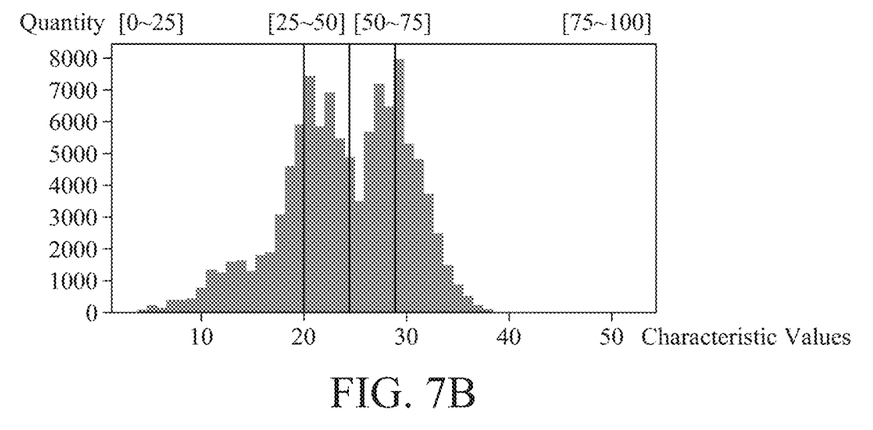
FIG. 7B is a histogram of a quantity of characteristic values versus characteristic values of the circuit to be detected during the testing stage.
Figure 7C:
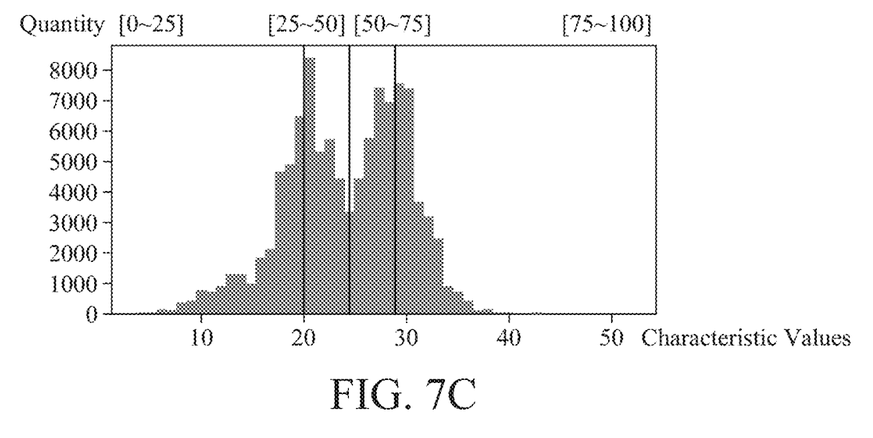
FIG. 7C is a histogram of a quantity of characteristic values versus adjusted characteristic values of the circuit to be detected.

In some embodiment, the distribution adjusting module 130 adjusts the characteristic values versus the quantity of the characteristic values according to a distribution function. Please refer to FIGS. 7A to 7C, FIG. 7A is a histogram of a quantity of characteristic values versus characteristic values completed during the training stage S1; FIG. 7B is a histogram of a quantity of characteristic values versus characteristic values of the circuit to be detected (for example, the logic gate circuit 200 in FIG. 2) during the testing stage S2; and FIG. 7C is a histogram of a quantity of characteristic values versus adjusted characteristic values of the circuit to be detected (for example, the logic gate circuit 200 in FIG. 2). In FIG. 7B, the distribution adjusting module 130 may adjust the characteristic values versus the quantity of the characteristic values within a specific interval of the distribution according to a training distribution. The distribution adjustment operation is represented, for example, by the following distribution function for readjustment:

$$x' = a + \frac{(x - \min(x))(b - a)}{\max(x) - \min(x)}$$

wherein x represents a characteristic value, x' represents an adjusted characteristic value, a represents a lower limit of said specific interval, b represents an upper limit of said specific interval. In the example of FIG. 7B, the percentile of each training characteristic and testing characteristic is segmented, for example, into four segments [0~25], [25~50], [50~75], [75~100]. For example, if said specific interval is [25~50] (that is, a=25, b=50), then the training result shown in FIG. 7A is used to rescale the characteristic values at the [25~50] interval to generate a new characteristic distribution, wherein the principle of rescaling is for the testing characteristic values of FIG. 7B to approach the training characteristic values of FIG. 7A as much as possible, or to have similar characteristic as the FIG. 7A. After rescaling, the adjusted distribution of the characteristic values as shown in FIG. 7C is generated, which may help improve the accuracy in Trojan detection.

Step S29 is using the classification module 140 to perform classification on all the characteristic values (including the adjusted characteristic values obtained from step S25 and the cleansed characteristic values obtained from S27) to generate the logic identification result, wherein the logic identification result is the identified Trojan logic gate in the logic gate circuit 200. In other words, the classification module 140 further performs the classification on the normal circuit and Trojan circuit to obtain the detection result of malicious attack. For example, the classification module 140 may obtain the detection result of the logic gate circuit 200, for example, the quantity of paths containing Trojan circuit in the logic gate circuit 200.

In order to further prove that the data processing method based on Trojan circuit detection of the present disclosure may indeed reduce the time and computing resources required by the detection circuit and improve the detection accuracy on Trojan circuits without knowing the standard cell library used, the following is illustrated in combination with the actual detection benchmark. Table 1 is the actual detection of multiple logic paths using the same standard cell library and different standard cell libraries under detection benchmark 1, wherein the detection benchmark may be altered, for example, may be altered to the detection benchmarks 2 and 3 described later. The detection content of the detection benchmark 1 comprises: Trojan detection results under the same standard cell library, under different standard cell libraries not performed with the distribution adjustment, and under different standard cell libraries performed with the distribution adjustment. The same standard cell library has a total of 107,074 normal paths; the different standard cell libraries have a total of 106,626 normal paths, and the Trojan paths are a total of 599. In detail, the "detected Trojan path" shown in table 1 represents a quantity of "actual Trojan path, and is determined as Trojan path"; "normal path" represents a quantity of "actual normal path, and is determined as normal path"; "falsely determined as Trojan path" represents a quantity of "actual normal path, but is determined as Trojan path"; and "missed Trojan path" represents a quantity of "actual Trojan path, but is determined as normal path".

TABLE 1

(unit: path quantity)

| Scenario Index | same standard cell library | different standard cell libraries, not performed with the distribution adjustment | different standard cell libraries, performed with the distribution adjustment |
| --- | --- | --- | --- |
| detected Trojan path | 619 | 4 | 225 |
| normal path | 107074 | 106626 | 106612 |
| falsely determined as Trojan path | 0 | 0 | 14 |
| missed Trojan path | 11 | 595 | 374 |

As seen from table 1, the data processing circuit 100 of the present disclosure successfully detects 619 Trojan paths from 630 paths under the circumstance of the same standard cell library, but only 4 Trojan paths are detected under the circumstance of different standard cell libraries and not performed with the distribution adjustment. After performing the distribution adjustment for different standard cell libraries (equivalent to step S27 of FIG. 4), 225 Trojan paths are successfully detected, which means one third of the Trojan paths are successfully retrieved. That is, for the 595 originally undetected Trojan paths, there are now 221 Trojan paths successfully detected.

In addition, it can be seen from table 1 that the distribution adjustment only applies under the presumption for different standard cell libraries, because under the circumstance of the same standard cell library, the detection of Trojan paths performed by the present disclosure is already accurate enough. Therefore, before performing the distribution adjustment in step S25 of FIG. 4, the present disclosure further determines whether the path belongs to the standard cell library, to quickly distinguish whether the path to be detected is known or unknown, to make sure only performing the distribution adjustment when needed, which helps the overall improvement in Trojan detection.

Next, table 2 observes according to the top N logic gates, the logic gates with the top N highest scores (for example, the top N logic gates ranked in the probability of Trojan location analysis) in the detection benchmark 1, wherein N may be 5-20. In other words, when locating the Trojan, each logic gate has a probability showing the possibility of the logic gate being the Trojan. Then, the top N logic gates may be used for verification, wherein N may be 5-20. As shown in table 2, the data processing circuit 100 of the present disclosure respectively locates 4, 5, and 10 logic gates with Trojan from the top 5 logic gates, top 10 logic gates and top 20 logic gates under the circumstance of the same standard cell library; respectively locates 3, 5, and 5 logic gates with Trojan from the top 5 logic gates, top 10 logic gates and top 20 logic gates under the circumstance of different standard cell libraries; and respectively locates 4, 6, and 9 logic gates with Trojan from the top 5 logic gates, top 10 logic gates and top 20 logic gates after performing the distribution adjustment for different standard cell libraries (equivalent to step S27 in FIG. 4). Therefore, as seen from table 2, the distribution adjustment of the present disclosure improves the efficiency in Trojan detection.

TABLE 2

(unit: quantity of logic gate)

| Representative logic gate/ scenario | same standard cell library | different standard cell libraries | after distribution adjustment |
| --- | --- | --- | --- |
| top 5 logic gates | 4 | 3 | 4 |
| top 10 logic gates | 5 | 5 | 6 |
| top 20 logic gates | 10 | 5 | 9 |

Then, table 3 illustratively shows the efficiency under different detection benchmarks of the data sampling operation and the data filtering operation of the present disclosure (step S23 in FIG. 4), wherein the sampling setting of three types of detection benchmarks all are: the path similarity value=longest path×0.8; the path diversity value=longest path×0.4, but the present disclosure is not limited thereto, and these parameters may be adjusted according to actual design.

TABLE 3

(unit: quantity of path)

| detection benchmark | original quantity of paths | quantity of paths after data sampling | kept Trojan paths/normal paths | abandoned Trojan paths/normal paths |
| --- | --- | --- | --- | --- |
| detection benchmark 1 | 432850 | 200007 | 582/83073 | 0/116352 |
| detection benchmark 2 | 440958 | 204528 | 5104/91914 | 0/107510 |
| detection benchmark 3 | 432218 | 200490 | 1066/125460 | 0/73964 |

Take detection benchmark 1 as an example, as seen from table 3, after performing the data sampling operation of the present application, the quantity of paths needed to be determined (detected) on having Trojan logic gate or not is less than half of the original number (reduced to 200007 paths); then, the paths after performing the data sampling are performed with the data filtering operation. After data filtering operation, it is determined that 116352 paths may be abandoned (that is, these 116352 paths do not need to be detected), and the quantity of unfiltered paths is only 83073, which is approximately 20% of the original quantity of paths needed to be determined (detected). Lastly, these 83073 target paths actually have 582 paths contain Trojan, and the abandoned 116352 paths do not have any Trojan path.

Take the detection benchmark 2 as an example, as seen from table 3, after performing the data sampling operation of the present application, the quantity of paths needed to be determined (detected) on having Trojan logic gate or not is less than half of the original number (reduced to 204528 paths); then the data filtering operation is performed on the paths performed with the data sampling operation. After the data filtering operation, it is determined that 107510 paths may be abandoned (that is, these 107510 paths do not need to be detected), and the quantity of unfiltered paths is only 91914, which is approximately 20% of the original quantity of paths needed to be determined (detected). Lastly, these 91914 target paths actually have 5104 paths contain Trojan, and the abandoned 107510 paths do not have any Trojan path.

Take the detection benchmark 3 as an example, as seen from table 3, after performing the data sampling operation of the present application, the quantity of paths needed to be determined (detected) on having Trojan logic gate or not is less than half of the original number (reduced to 200490 paths); then the data filtering operation is performed on the paths performed with the data sampling operation. After the data filtering operation, it is determined that 125460 paths need to be determined (detected) are left and used as the target paths. Lastly, these 125460 target paths actually have 1066 paths contain Trojan, and the 73964 paths left after the filtering do not have any Trojan path.

Then, the data filtering operation is performed on the paths performed with the data sampling operation. After the data filtering operation, it is determined that 73964 paths may be abandoned (that is, these 73964 paths do not need to be detected), and the quantity of unfiltered paths is only 125460, which is approximately 30% of the original quantity of paths needed to be determined (detected). Lastly, these 125460 target paths actually have 1066 paths contain Trojan, and the 73964 paths left after the filtering do not have any Trojan path.

In view of the above description, the present disclosure adjusts the testing stage S2 through the training result of the training stage S1, wherein a plurality of pieces of training information are inputted to the training stage. The testing stage S2 further reduces the quantity of logic paths need to be detected through the data cleansing operation and the distribution adjustment operation. Therefore, the present disclosure may provide an accurate identification result of the Trojan logic gates at the same time significantly reducing the computing time.

What is claimed is:
1. A data processing method based on Trojan circuit detection, comprising controlling a processor, in a testing stage, to perform following steps:
   obtaining a plurality of characteristic values corresponding to a logic gate circuit, wherein the logic gate circuit comprises a plurality of logic gates and a plurality of paths formed by the logic gates;
   performing a distribution adjustment operation on the characteristic values to generate a plurality of adjusted characteristic values; and
   performing classification on the adjusted characteristic values to generate a logic identification result,
   wherein before performing the distribution adjustment operation, the method further comprises performing following operations by the processor:
      performing a data sampling operation on the characteristic values to generate a data sampling result; and
      performing a data filtering operation on the data sampling result to update the characteristic values,
   wherein the data filtering operation comprises:
      examining the paths one by one, and
      when a probability of a net line signal of all logic gates of a first current path among the paths being 0 is greater than a first threshold value, abandoning the first current path, and/or
      when a probability of the net line signal of all logic gates of the first current path being 1 is greater than a second threshold value, abandoning the first current path.

2. The data processing method according to claim 1, wherein in a training stage, the processor performs:
   obtaining a plurality of training characteristic values through a logic gate netlist and a training standard cell library; and
   performing the classification on the training characteristic values to generate a trained logic identification result.

3. The data processing method according to claim 1, further comprising:
   determining whether a standard cell library is a known standard cell library; and
   using the characteristic values as the adjusted characteristic values when the standard cell library is the known standard cell library,
   wherein performing the distribution adjustment operation on the characteristic values to generate the adjusted characteristic values is performed when a standard cell library is not a known standard cell library.

4. The data processing method according to claim 1, wherein the data sampling operation comprises:
   examining the paths one by one to determine whether a second current path among the paths encounters a logic gate that another path among the paths has passed by.

5. The data processing method according to claim 4, wherein the data sampling operation further comprises:
   determining whether a level-to-output distance of the second current path is greater than or equal to a path similarity value when the second current path encounters the logic gate that the another path has passed by.

6. The data processing method according to claim 5, wherein the data sampling operation further comprises:
   determining whether a quantity of logic gates that the second current path passes by is smaller or equal to a path diversity value when the level-to-output distance of the second current path is greater than or equal to the path similarity value; and
   abandoning the second current path when the quantity of the logic gates that the second current path passes by is smaller or equal to the path diversity value.

7. A data processing circuit based on Trojan circuit detection, coupled to a logic gate circuit, wherein the data processing circuit comprises a processing module, a distribution adjusting module, a classification module and a data cleansing module, and the data processing circuit, in a testing stage, performs:
   the processing module obtaining a plurality of characteristic values corresponding to a logic gate circuit, wherein the logic gate circuit comprises a plurality of logic gates and a plurality of paths formed by the logic gates;

the distribution adjusting module performing a distribution adjustment operation on the characteristic values to generate a plurality of adjusted characteristic values; and the classification module performing classification on the adjusted characteristic values to generate a logic identification result, wherein before the distribution adjustment operation, the data cleansing module is configured to perform:
performing a data sampling operation on the characteristic values to generate a data sampling result; and
performing a data filtering operation on the data sampling result to update the characteristic values, wherein the data filtering operation comprises:
examining the paths one by one, and
when a probability of a net line signal of all logic gates of a first current path among the paths being 0 is greater than a first threshold value, abandoning the first current path, and/or
when a probability of the net line signal of all logic gates of the first current path being 1 is greater than a second threshold value, abandoning the first current path.

8. The data processing circuit according to claim 7, further comprising, in a training stage, performing:
the processing module obtaining a plurality of training characteristic values through a logic gate netlist and a training standard cell library; and
the classification module performing the classification on the training characteristic values to generate a trained logic identification result.

9. The data processing circuit according to claim 7, wherein the distribution adjusting module determines whether a standard cell library is a known standard cell library, the distribution adjusting module performs the distribution adjustment operation on the characteristic values to generate the adjusted characteristic values when the standard cell library is not the known standard cell library, and the distribution adjusting module uses the characteristic values as the adjusted characteristic values when the standard cell library is the known standard cell library.

10. The data processing circuit according to claim 7, wherein the data cleansing module performing the data sampling operation comprises:
examining the paths one by one to determine whether a second current path among the paths encounters a logic gate that another path among the paths has passed by.

11. The data processing circuit according to claim 10, wherein the data sampling operation further comprises:
determining whether a level-to-output distance of the second current path is greater than or equal to a path similarity value to determine whether to abandon the second current path, when the second current path encounters the logic gate that the another path has passed by.

12. The data processing circuit according to claim 11, wherein the data sampling operation further comprises:
determining whether a quantity of logic gates that the second current path passes is smaller or equal to a path diversity value when the level-to-output distance of the second current path is greater than or equal to the path similarity value; and
abandoning the second current path when the quantity of logic gates that the second current path passes is smaller or equal to the path diversity value.

* * * * *